(No Model.)

J. C. BARNEY.
CARRIAGE COUPLING.

No. 314,987. Patented Apr. 7, 1885.

Witnesses:
Basil H. Messler
Lorenzo D. Benner

Inventor,
John C. Barney,
per A. B. Upham,
His Attorney.

N. PETERS, Photo-Lithographer, Washington, D. C.

UNITED STATES PATENT OFFICE.

JOHN C. BARNEY, OF PEORIA, ILLINOIS.

CARRIAGE-COUPLING.

SPECIFICATION forming part of Letters Patent No. 314,987, dated April 7, 1885.

Application filed June 2, 1884. (No model.)

*To all whom it may concern:*

Be it known that I, JOHN C. BARNEY, of Peoria, in the county of Peoria, in the State of Illinois, have invented an Improved Carriage-Coupling; and I do hereby declare that the following is a full, clear, and exact description thereof, reference being had to the annexed drawings, making a part of this specification, in which like letters of reference refer to like parts, and in which—

Figure 1:
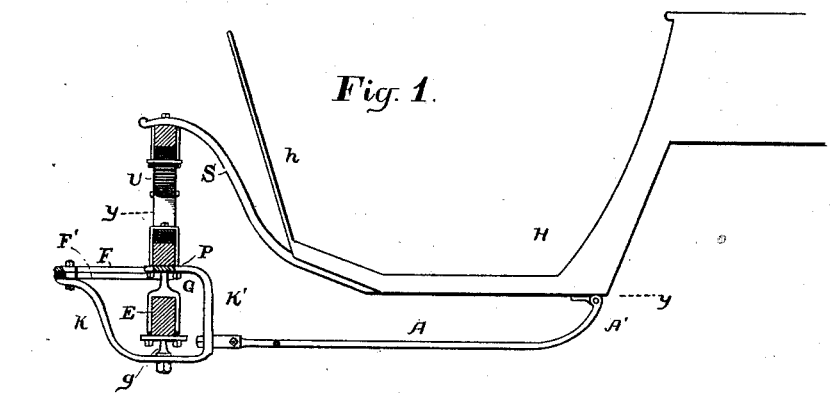
Figure 2:
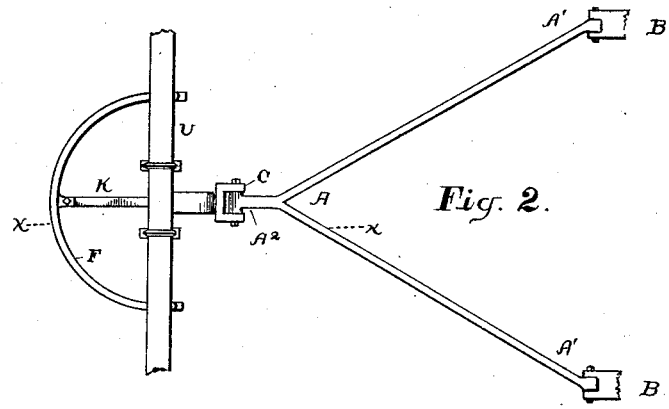
Figure 3:
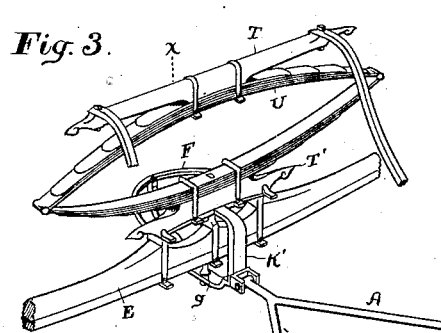
Figure 4:
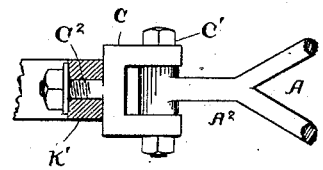

Figure 1 represents a vertical section at $x$ $x$ in Figs. 2 and 3; Fig. 2, a horizontal section at $y\ y$ in Fig. 1; Fig. 3, a perspective view of my invention; Fig. 4, a detail view.

The object of this invention is the construction of means whereby the ordinary reach-pole, extending from the fore to the hind axle of a carriage or other vehicle, may be dispensed with, the carriage-body set low down, and the pull on the fore axle be transmitted directly to the frame of the carriage-body.

My invention for this purpose consists of a bifurcated rod swivelly connected to the front axle of the vehicle at one end, and at its double end to the frame of the body of the vehicle.

In the drawings. A is the bifurcated rod, connected at its front or single end to the front axle, E, and secured at its double ends to the body of the vehicle H.

In Fig. 1 I have shown the front portion of a double-seated carriage, usually termed a "phæton;" but my device is equally applicable to any other form of light vehicles in which springs are employed.

To bring my carriage-body nearer to the ground, I prolong the supporting-irons S forward and upward. Their ends being bolted to the cross-bar T, the elliptic springs, upon which said bar rests, are brought in front of the dash-board $h$. If a circle or fifth-wheel were to be formed at the rear of the axle E, as is the custom, it would be in the way of the dash-board. To remedy this I have my circle F project forward, and also, for the sake of elegance of appearance, make it of as short a radius as possible consistent with strength. The upper part of this circle F is formed as a part of the plate P, which is firmly secured to the bar T'. The under part, F', of the circle F is fastened at its ends to the axle E. From the center of said upper part, F, extends a brace, K, to the auxiliary center pin, $g$, at the under side of the axle E, and from thence back behind said axle and up to the plate P, to which it is rigidly connected. It is to the rear portion, K', of said brace K that I secure the front end of the bifurcated or Y-shaped rod A. Since the body of the carriage, by its springs, can have a greater or less vertical motion, I fasten the rod A to said body and to the brace K' with transverse horizontal pivots B and C'. This permits the springs U to remain approximately vertical, whatever the variation in the carriage-body's height, and also relieves the same of the otherwise consequent strain. Should one wheel of the vehicle become higher or lower than the other three by passing over a stone, into a depression, or otherwise, the front axle, E, would be more or less canted relative to the vehicle-body and there would be considerable torsional strain upon the rod A. To remedy this I have the coupling C connected to the brace K' by a horizontal swivel, $C^2$, which, taken in connection with the pivot C', forms a universal joint, as shown in Fig. 4.

Although I have shown and described the bifurcated rod A in connection with the front axle alone of the carriage, I design to use the same for the rear axles of many forms of vehicles.

In addition to the bifurcated rod A, holding the front axle to the body of the carriage, I would have a similar bifurcated rod, A, pivoted at its ends A' to the rear axle, and at its single end $A^2$ to the under side of the vehicle-body. In using the said rod for the rear axle its construction and that of its universal joint C $C^2$ would be similar to that previously described. In place, however, of the brace K', there would be a short angle-iron bolted to the under side of the vehicle-body, to which to secure the coupling C.

What I claim as my invention is as follows, to wit:

In combination with the front axle and fifth-wheel, brace K', the coupling C, so joined to said brace as to permit said coupling to turn in a vertical plane at right angles to said axle, the bifurcated rod A, having its single end joined to said coupling with a pivotal connection the axial center of which is parallel to said vehicle-axle, and connections for pivotally securing the bifurcated ends of the rod A to the under side of the vehicle, as and for the purpose specified.

In testimony that I claim the foregoing invention I have hereunto set my hand and seal this 29th day of May, 1884.

JOHN C. BARNEY. [L. S.]

Witnesses:
W. BOOTH,
A. B. UPHAM.